United States Patent Office 2,931,757
Patented Apr. 5, 1960

2,931,757

STERILITY TESTING MEANS

Edward J. Rdzok and Walton E. Grundy, Waukegan, Ill., assignors to Abbott Laboratories, North Chicago, Ill., a corporation of Illinois No Drawing. Application June 25, 1956
Serial No. 593,386

7 Claims. (Cl. 195—103.5)

This invention relates to the preparation and use of sterility testing means and more particularly to spore-impregnated carriers which are used to quantitatively determine the effectiveness of any given sterilizing procedure.

Heretofore, efforts to determine the time required for the complete sterilization of relatively uncontaminated containers, packages or other units and specific areas thereof have not been practical nor feasible because such units contain too few bacteria to permit accurate determinations.

It is therefore an object of the present invention to provide a special spore-impregnated carrier on which known numbers of selected viable spores are deposited and on which the spores remain constant in number and viable over a long period of time.

It is another object of the present invention to provide a special spore-impregnated carrier on which the said spores will remain fixed to facilitate the quantitative removal of said microorganisms in mass.

It is a further object of the present invention to provide a special spore-impregnated carrier which can be uniformly dispersed in a liquid medium after sterilization to provide a uniform spore suspension.

Another object of the invention is to provide a novel spore-impregnated carrier whereby the effectiveness of any chosen sterilization procedure can be accurately and economically evaluated.

A further object of the invention is to provide a means for readily determining the critical time period in which sterilization is complete in any particular area or space undergoing sterilization.

A still further object of the present invention is to provide a means by which the degree of sterilization effected in a given area can be more readily and accurately determined.

Other and further advantages and objectives will be apparent to those skilled in the art by referring to the following detailed description and claims to follow.

In general, the present invention comprises providing an inert spore-absorbing carrier in the form of a relatively thin wafer-like body on which accurately known numbers of relatively stable, viable spores of a microorganism, preferably relatively more resistant to sterilization than the usual contaminating organisms, are absorbed. The spore-absorbent-carrier is made of a material which can be readily and uniformly dispersed in a fluid, such as water after being subjected to a sterilization process. A number of said carriers containing the said spores absorbed thereon are then dried and preferably enclosed in a vial or the like container where they are kept until used. Replicate determinations involving disintegration of the carrier indicate that stable spore counts can be realized for indefinitely long periods. Spore-impregnated carriers stored for one year still show the original spore counts.

When used, the spore-impregnated, readily-disintegratable carriers are inserted into the desired area of a package or other unit prior to subjecting the package to sterilization. After sterilization of the unit under the predetermined conditions, the carrier is removed, disintegrated by appropriate means, and a quantitative measurement of the number of viable spores remaining is determined by a standard bacterial plate count technique. In this way, a quantitative measurement may be determined of the effectiveness of a chosen sterilization method.

The following specific examples are for the purpose of illustrating the preparation and use of the test strips in accordance with the present invention. It should be understood that these examples serve by way of illustration only and are not intended to limit the invention to the precise materials shown nor the applications and use thereof.

EXAMPLE I

A dried spore preparation of *Clostridium sporogenes* is appropriately diluted to a concentration of 1,000,000 spores per ml., and then 0.02 ml. of this appropriate spore suspension is used to individually moisten each of the separate strips of filter paper substantially free of contamination and cut into strips ¼ inch wide and one inch long. The 0.02 ml. volume of the diluted suspension deposits 20,000 spores on each test strip. After several hundred strips are inoculated in this manner, they are dried in a 37° C. incubator for 24 hours. The paper strips are preferably arranged in cart-wheel fashion in Petri's dishes during the moistening and drying process. The dried paper strips are preferably placed in sealed vials where they remain until used.

The spore count of the strips is checked before the strips are actually utilized in a sterilization study. This is done by placing ten strips having the dried spores absorbed thereon in a Waring Blendor, adding 100 ml. of sterile water and then completely disintegrating the test strips. Complete disintegration is achieved in two or three minutes. Plate counts and/or most probable number determinations are made from this filter paper suspension. Generally about 75% of the spores placed on said impregnated strips are recoverable in the counting process; therefore, of the 20,000 spores added to each strip, approximately 15,000 spores are recovered. This loss in recovered spores is constant and is believed to be due to a constant experimental factor, since a 15,000 recovery count is repeatedly observed on strips initially prepared in the foregoing manner and on strips held up to at least one year.

EXAMPLE II

Following the same procedure of Example I, a dried spore preparation of *Bacillus globigii* is used to inoculate the paper strips in place of the *Clostridium sporogenes* preparation used in Example I, and stable test strips containing 20,000 spores of the said microorganism are obtained.

EXAMPLE III

Following the procedure of Example I, a dried spore preparation of *Bacillus stearothermophilus* is used to inoculate the paper strips in place of the *Clostridium sporogenes* preparation used in Example 1. The only modification involves the amount of spores deposited on said carriers. This particular bacterial spore is so highly resistant to sterilization by heat that carriers prepared with 3,000 spores thereon are adequate as test strips, since an aqueous dispersion of the said carrier consistently yields about 2,000 of the said spores prior to sterilization.

Test organisms used in Examples I, II, and III are particularly useful in the present invention because these spore-forming bacteria of the genera Bacillius and Clostridium remain viable for long periods on the test strips after drying. Mold spores are also useful but to a lesser degree because they do not retain their viability on the test strips for as long a time as bacterial spores. Thus, the said bacterial spores are ideal sterility test organisms, for they belong to that class of microorganisms which are most resistant to sterilization. Consequently, the acquisition of a contamination-free state by any chosen medium and period of time in an area where these test organisms were present is ample assurance that other forms of microorganisms have also been destroyed. This is particularly true with regard to the test organism *Bacillus stearothermophilus*.

EXAMPLE IV

The spore-impregnated strips prepared according to Example II were used to determine the time required for complete sterilization of plastic intravenous injection sets. Such units normally contain so few bacteria that bacterial count data on the usual uncontaminated sets was of no value in determining the necessary sterilization time.

Thus, the said spore-impregnated filter paper test strips bearing *Bacillus globigii* spores were placed in the cap assembly and under the needle adaptor hood of 30 such injection sets. These sets were then packed in the center of a carton containing a total of 120 units. The cartons were treated with ethylene oxide gas for varying time periods. After withdrawing the cartons from the gas chamber, the test strips were removed from the intravenous injection units and disintegrated ten at a time in a Waring Blendor. This suspension of disintegrated filter paper was used for bacterial plate counts and sterility tests by the standard tube technique. The data of Table I shows that two hours were required to obtain complete sterility under the testing conditions.

*Table I.—Steriliziation of intravenous units with ethylene oxide vapor*

| Process Time, Hours | Plate Count, Spores/Strip | | Sterility Test | |
|---|---|---|---|---|
| | Cap Assembly | Adaptor Hood | Cap Assembly | Adaptor Hood |
| 0.5 | 337 | 6,200 | Contaminated. | Contaminated. |
| | 396 | 4,300 | do | Do. |
| | 297 | 4,400 | do | Do. |
| 1.0 | <10 | 740 | do | Do. |
| | <10 | 576 | Sterile | Do. |
| | <10 | 553 | do | Do. |
| 2.0 | <10 | <10 | do | Sterile. |
| 2.0 | <10 | <10 | do | Do. |
| 2.0 | <10 | <10 | do | Do. |
| 4.0 | <10 | <10 | do | Do. |
| 6.0 | <10 | <10 | do | Do. |

EXAMPLE V

Spore-absorbent carriers prepared according to Example II impregnated with *Bacillus globigii* spores were placed inside a number of unsterilized, empty, single, disposable plastic injection sets. One test strip was placed inside each unit and the open end of this unit was then sealed with heat. A portion of the sets so prepared were exposed to ethylene oxide and the remaining portion was exposed to formaldehyde. After expiration of a selected time, the test strips were removed, broken up in a disintegrator, such as a Waring Blendor, and cultured for viable spores. No viable spores were detected.

EXAMPLE VI

To determine adequate sterilization time for test tubes located in the center of a basket tightly packed with tubes, test strips impregnated with 15,000 *Clostridium sporogenes* spores were placed in said tubes. The tubes contained fluid thioglycollate medium as the culture medium. After the basket containing the test tubes was autoclaved, the tubes containing the culture media were incubated at 37° C. and cultured for the growth of spores. Since no growth had occurred, it was concluded that the media had received adequate heat treatment.

The impregnated test strips or spore-impregnated carriers of the present invention embrace wide applications in fields other than the foregoing, such as, for example, determination of the quantitative killing effect of germicides. This can be accomplished by impregnating test strips with known numbers of spores of a test organism and subjecting same to the germicidal solution for a defined period of time.

In addition to the bacterial spores enumerated by way of the specific examples, other spore-forming bacteria, such as *Bacillus subtilis* and *Bacillus cereus*, can be utilized as test organisms on the said carriers.

Since mold spores, such as *Aspergillus niger*, will remain viable on the paper strips for a considerable period, test strips similar to those prepared with bacterial spores can be made and used.

In the specific examples, the spore-absorbent carriers have been prepared from absorbent filter paper of the type used for paper chromatography (chromatography paper No. 613, 5/16 inch wide, made by the Eaton-Dikeman Co.) by cutting the said paper strips into sections about one inch long. It is generally not necessary to previously sterilize such paper, since the paper as received from the manufacturer is substantially free of contamination.

Materials other than absorbent filter paper can also be used as carriers for the microorganism spores. These include other fibrous carriers, such as absorbent fabrics; water soluble carriers, such as blocks of agar or gelatin; powdered insoluble carriers, such as sterilized soil, starch, clay, cellulose, etc.; and powdered soluble carriers, such as lactose, dextrose, mannitol, soluble starch, sucrose, etc., which can be used as a powder or, if desired, readily formed into small blocks or wafer-like bodies. The requirements which the carrier must meet are that it be relatively non-hygroscopic, inert so as to be non-injurious to the spores, stable and capable of being uniformly and substantially completely disintegrated in a disintegrator, such as a Waring Blendor.

Others may readily adapt the invention for use under various conditions of service, by employing one or more of the novel features disclosed or equivalents thereof. As at present advised with respect to the apparent scope of our invention, we desire to claim the following subject matter.

We claim:

1. An article of manufacture for testing sterility comprising an inert, solid, non-hygroscopic carrier material in the form of a thin, wafer-like body, said wafer-like body being readily disintegrated in an aqueous medium and uniformly dispersible therethrough, and an accurately predetermined number of microorganism spores being adsorbed on the said wafer-like body and being retained thereon in a culturable form for a period of at least six months.

2. An article of manufacture for testing sterility comprising a carrier of absorbent, inert, non-hygroscopic paper in the form of small strips, said carrier being readily disintegrated in an aqueous fluid medium and uniformly dispersed therethrough, and an accurately predetermined number of microorganism spores being adsorbed on said carrier and being retained thereon in a culturable form for a period of at least six months.

3. An article of manufacture for testing sterility comprising an inert, solid, non-hygroscopic carrier material in the form of a thin, wafer-like body, said wafer-like body being readily disintegrated in an aqueous fluid medium and uniformly dispersed therethrough, and an accurately predetermined number of bacterial spores selected from the group consisting of *Bacillus globigii, Bacillus stearothermophilus, Bacillus subtilis, Bacillus cereus, Clostridium sporogenes* and *Aspergillus niger* being adsorbed on said wafer-like body and being retained thereon in a culturable form for a period of at least six months.

4. An article of manufacture for testing sterility comprising a carrier of absorbent, inert, non-hygroscopic filter-paper in the form of small strips, said carrier being readily disintegrated in an aqueous fluid medium and uniformly dispersed therethrough, and an accurately predetermined number of bacterial spores selected from the group consisting of *Bacillus globigii, Bacillus stearothermophilus, Bacillus subtilis, Bacillus cereus, Clostridium sporogenes* and *Aspergillus niger* being adsorbed on said carrier and being retained thereon in a culturable form for a period of at least six months.

5. The method of quantitatively determining the effectiveness of a sterilization process which comprises inserting the spore-absorbent carrier of claim 1 into a desired area to be sterilized and removing the said carrier having the said spores absorbed thereon from the said area after exposure to the said sterilization process, preparing a uniformly dispersed liquid suspension of the said carrier having the said spores absorbed thereon, and quantitatively determining the number of viable spores remaining in said suspension.

6. The method of quantitatively determining the effectiveness of a sterilization process which comprises placing in an area to be subjected to sterilization a disintegrable carrier of absorbent paper in the form of a paper strip having absorbed thereon a known number of viable spores which can be retained thereon in culturable form for at least six months, removing said paper strip after exposure to the sterilization procedure, preparing a uniformly dispersed aqueous suspension of said paper strip and quantitatively determining the number of viable spores remaining in said suspension.

7. The method of quantitatively determining the effectiveness of a sterilization process which comprises placing in objects to be sterilized a disintegrable carrier of absorbent filter paper strip having absorbed thereon a known number of bacterial spores selected from the group consisting of *Bacillus globigii, Bacillus stearothermophilus, Bacillus subtilis, Bacillus cereus, Clostridium sporogenes* and *Aspergillus niger* which bacterial spores can be retained on said paper strip in culturable form for at least six months, removing said paper strip after exposure to the sterilizing procedure, preparing a uniformly dispersed aqueous suspension of said paper strip and quantitatively determining the number of viable spores remaining in said suspension.

References Cited in the file of this patent

UNITED STATES PATENTS 2,485,566     Clark _____ Oct. 25, 1949

OTHER REFERENCES

Textbook of Bacteriology by Zinsser et al., 7th ed., Appleton-Century Co., New York, N.Y. (1935), pp. 1151–1152.

Gershenfeld: Bacteriology and Allied Subjects, 1945, pub. by Mack Pub. Co., Easton, Pa., page 282.

Frobisher: Fundamentals of Microbiology, 1953, pub. by W. B. Saunders & Co., Philadelphia, Pa., pp. 228 and 229.

Antiseptics Disinfectants Fungicides and Sterilization, by Reddis; Lea & Febiger, Philadelphia, Pa. (1954), pp. 145 and 679–680.